(12) United States Patent
King

(10) Patent No.: US 6,557,489 B2
(45) Date of Patent: May 6, 2003

(54) PET DISH HOLDER

(76) Inventor: Nancy King, 932 W. 34th St., Kansas City, MO (US) 64111

( * ) Notice: Subject to any disclaimer, the term of this patent is extended or adjusted under 35 U.S.C. 154(b) by 0 days.

(21) Appl. No.: 09/888,854

(22) Filed: Jun. 25, 2001

(65) Prior Publication Data

US 2002/0195059 A1 Dec. 26, 2002

(51) Int. Cl.[7] ................................................. A01K 5/00
(52) U.S. Cl. ...................................... 119/51.01; 119/61
(58) Field of Search ............................. 119/161, 51.01, 119/51.5, 51.12, 51.15, 51.14, 72, 73, 62

(56) References Cited

U.S. PATENT DOCUMENTS

| 528,871 | A | * | 11/1894 | Greer | 119/61 |
|---|---|---|---|---|---|
| 763,951 | A | * | 7/1904 | Bethea | 119/61 |
| 767,643 | A | * | 8/1904 | Hodgens | 119/61 |
| 922,317 | A | * | 5/1909 | Nelson | 119/61 |
| 1,855,314 | A | * | 4/1932 | Schacht | 119/51.5 |
| 2,584,301 | A | * | 2/1952 | Sinclair | 119/61 |
| 2,845,896 | A | * | 8/1958 | Copeland | 119/51.01 |
| 3,202,131 | A | | 8/1965 | Jones | |
| 3,324,833 | A | * | 6/1967 | Clugston | 119/61 |
| 3,441,003 | A | | 4/1969 | DuMond et al. | |
| 4,065,195 | A | | 12/1977 | Fahmie | |
| D258,018 | S | * | 1/1981 | Venditto et al. | 119/51.5 |
| 4,658,759 | A | * | 4/1987 | Brown | 119/61 |
| 5,195,461 | A | * | 3/1993 | Brown | 119/61 |
| 5,297,504 | A | | 3/1994 | Carrico | |
| 5,458,087 | A | | 10/1995 | Prior et al. | |
| 5,526,773 | A | | 6/1996 | Richardson | |
| 5,560,315 | A | | 10/1996 | Lampe | |
| 5,628,276 | A | | 5/1997 | Raposa | |
| 5,743,210 | A | | 4/1998 | Lampe | |
| 5,787,839 | A | | 8/1998 | Magnant et al. | |
| 5,794,565 | A | | 8/1998 | Beshah | |
| 5,823,136 | A | | 10/1998 | Zarski | |
| 5,884,582 | A | | 3/1999 | Duckworth | |
| 5,960,741 | A | | 10/1999 | Ballen et al. | |
| 6,082,301 | A | | 7/2000 | Kramer | |
| 6,089,187 | A | | 7/2000 | Gaspary | |

FOREIGN PATENT DOCUMENTS

| GB | 2 188 525 A | * | 10/1987 | ............ A01K/5/00 |
|---|---|---|---|---|

* cited by examiner

Primary Examiner—Peter M. Poon
Assistant Examiner—Joan M. Olszewski
(74) Attorney, Agent, or Firm—Spencer Fane Britt & Browne LLP

(57) ABSTRACT

An apparatus is provided that prevents a pet from tipping over a food dish. The dish is placed in an open framework having a lid that covers only a portion of the dish, allowing a pet to access the dish for feeding. The apparatus includes spikes to anchor the framework into the ground. Additionally, the apparatus includes extensions, to adjust the height of the dish above the ground.

12 Claims, 3 Drawing Sheets

PET DISH HOLDER

FIELD OF THE INVENTION

The present invention relates to a holder for a pet dish. More particularly, the present invention relates to a holder for a pet dish that allows a pet to access a bowl of food or water, while preventing the pet from tipping over or moving the bowl.

BACKGROUND OF THE INVENTION

Pet owners, and particularly owners of large pets, such as large dogs, often face the common problem of the pet tipping over and spilling its food and/or water bowls. Such is undesirable, especially when the pet is kept outdoors for an extended period of time, requiring adequate supplies of food and water. Additionally, outdoor feeding leads to increased difficulties with sanitation and bugs.

Several pet bowls have been developed to prevent a pet from tipping over the bowl and spilling its food. Each of these bowls has been designed specifically to include spikes that can be set in the ground to hold the bowl in position without tipping over. For example, U.S. Pat. No. 3,202,131, issued to Jones, discloses the use of retractable spikes attached to a bowl to allow the bowl to be anchored to the ground. This bowl requires the pet owner to remove the spikes from the ground whenever the bowl is to be removed for cleaning and refilling of food/water. Such is inconvenient for the pet owner and may become even more taxing during periods of dry weather when hard ground conditions make repetitive removal and replacement of the spikes difficult. U.S. Pat. No. 5,628,276, issued to Raposa, also discloses a bowl that utilizes a spike to anchor the bowl to the ground. The bowl of Raposa has been specially designed with a cylindrical post in the middle to accept the spike. While the bowl of Raposa can be removed from the spike for cleaning and refilling, only the specially designed bowl can be held in position by the spike.

In addition to the pet dishes discussed above, several pet dish holders have also been developed in an attempt to address the needs of pet owners. An example of a pet dish holder that has been designed to anchor into the ground is disclosed in U.S. Pat. No. 5,526,773, issued to Richardson. Richardson discloses a solid frame dish holder that is anchored to the ground by a screw. A specially designed dish fits into the solid frame. The pet dish holder of Richardson has several disadvantages that are undesirable to many pet owners. The primary disadvantage is that the solid, closed framework of Richardson is specifically designed to retain a trough of water to isolate the dish from the ground and from crawling insects. In addition to retaining water, this solid framework will tend to retain food particles and other debris, requiring removal of the dish holder from the ground for proper cleaning. Insufficient cleansing of the dish performed by the pet owner will result in unsanitary conditions, creating a health hazard for the pet. As many pet owners do not have time to constantly remove the dish holder from the ground, it is desirable to develop a dish holder that does not require active cleaning by the pet owner. Another disadvantage of the dish holder of Richardson is the fact that it is designed only to hold a dish that has been specially designed for the holder. This holder does not allow pet owners the flexibility to easily substitute or replace dishes.

It is desirable to design a sanitary pet dish holder that will prevent spillage of food and water that also allows for interchangeability of bowls of various shapes and sizes. It is also desirable to design a pet dish holder that does not require a pet owner to actively clean the holder. Additionally, owners of large pets often desire elevated dish holders to improve their pet's posture during feeding.

SUMMARY OF THE INVENTION

A principle object of the present invention is to provide a pet dish holder that will prevent spillage of food and water. This is accomplished through a framework designed to hold a bowl in position. Projecting from the framework are several spikes designed to anchor the holder to the ground.

Another object of the present invention is to provide a pet dish holder that allows for interchangeability of bowls of various shapes and sizes. This object is attained through the inclusion of a partial lid attached to the framework. The lid is adapted to provide access to the bowl and simultaneously to prevent extraction of the dish from the frame while the lid is in a closed position. The lid can be attached to the frame by a hinge or latch mechanism, or by a combination of both a hinge and a latch.

Still another object of the present invention is to provide a pet dish holder that requires no active cleaning by the pet owner. This object is achieved through the use of an open framework that allows food particles and other debris to fall through the framework away from the dish holder.

Another object of the instant invention is to provide a pet dish holder that is elevated to improve a large pet's posture while feeding. This is accomplished through the use of extensions between the spikes and the frame. In addition to improving posture, the extensions also improve the passive cleaning properties of the dish holder by raising the holder off the ground away from fallen food particles and debris.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

A Preferred embodiment of the invention illustrative of the best mode in which the applicant has contemplated applying the principles, is set forth in the following description and is shown in the drawings and is particularly and distinctly pointed out and set forth in the appended claims.

DESCRIPTION OF THE PREFERRED EMBODIMENT

A preferred embodiment of the present invention is hereinafter described with reference to the accompanying drawings.

Figure 1:
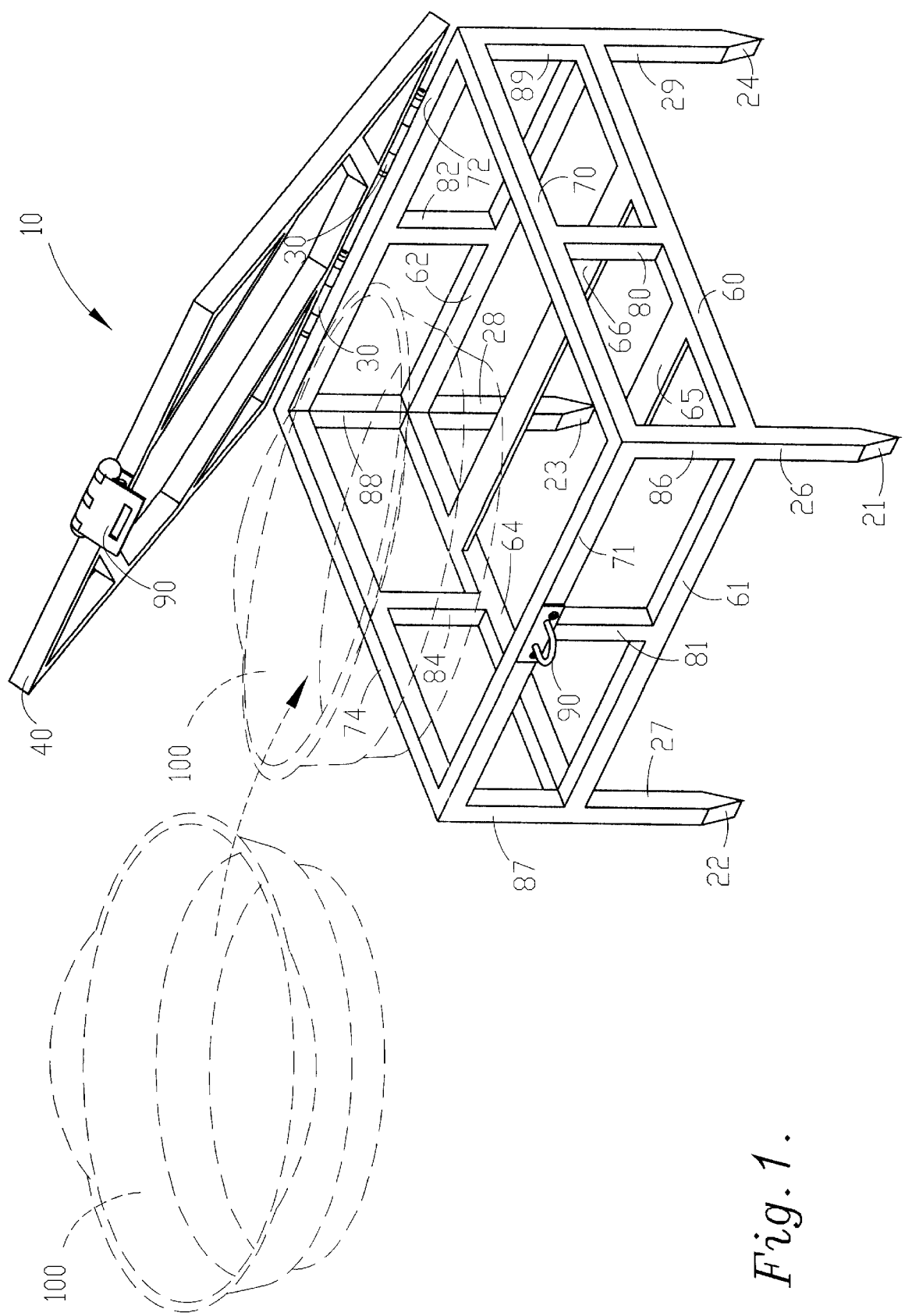
FIG. 1 is a perspective view of the dish holder of the present invention showing the lid in an open position.
Figure 2:
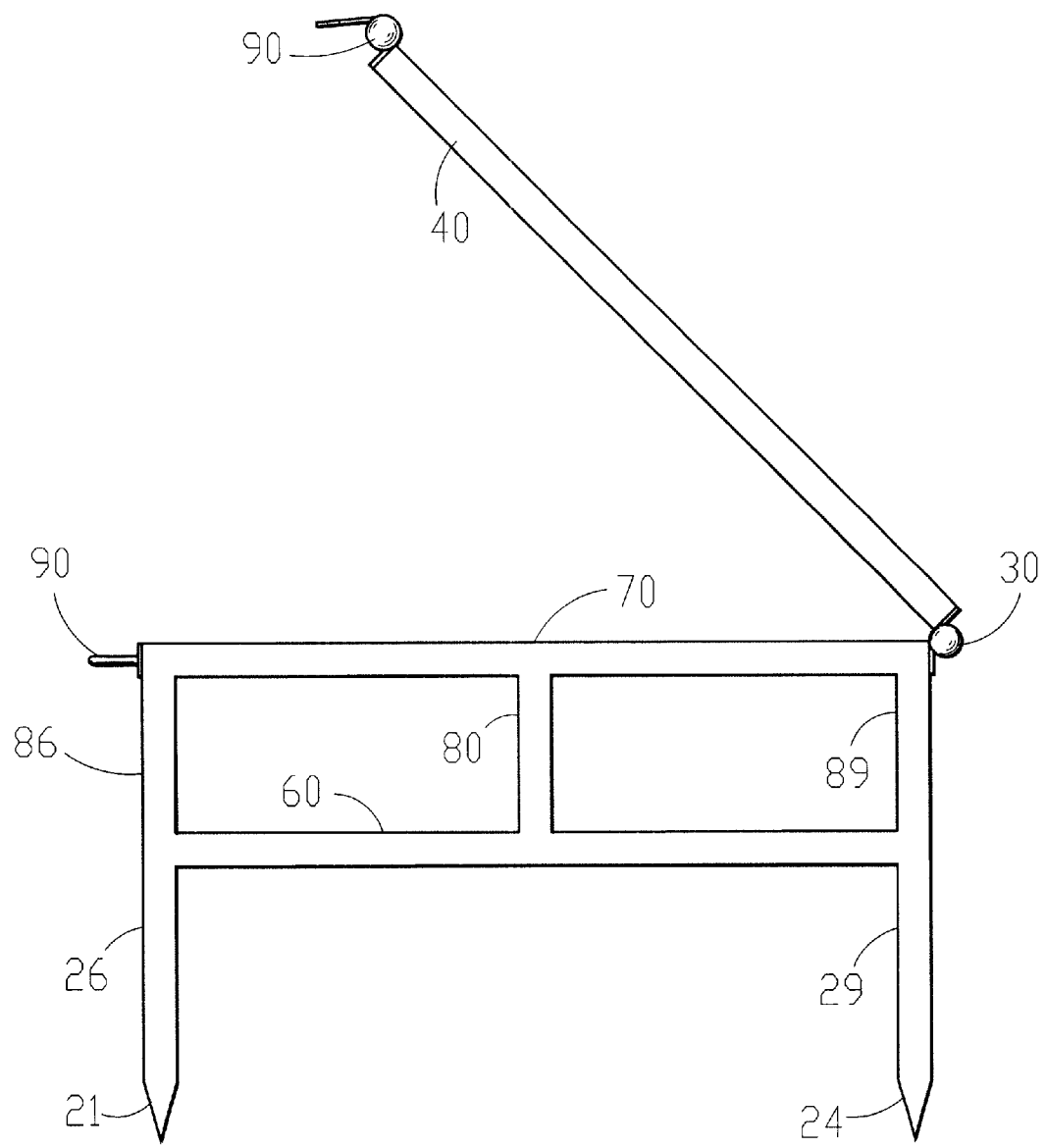
FIG. 2 is a side view of the invention of FIG. 1 showing the lid in an open position.

Referring to FIG. 1, a perspective view of the invention placed in an open position for insertion and removal of a bowl is provided. Dish 100 is shown in phantom as it is being inserted into pet dish holder 10. Lid 40 is in a raised position, as shown in FIGS. 1 and 2, to allow for the insertion and removal of dish 100 into holder 10.

Pet dish holder 10 is constructed as an open framework to prevent collection of food particles and other debris within holder 10. Dish 100 rests within holder 10 on bottom cross-member supports 65 and 66. Bottom cross-member supports 65 and 66, lower-front wall member 61, and lower-rear wall member 62 are connected to lower side-wall members 60 and 64 to form the bottom side of dish holder 10. The bottom side of dish holder 10 is connected to the top side of dish holder 10 via corner cross-members 86, 87, 88 and 89 and via central cross-members 80, 81, 82 and 84. Central cross-members 80, 81, 82 and 84 prevent insertion and removal of a dish through the vertical walls (i.e. side-walls, front wall and rear wall) of holder 10. The top side of dish holder 10 is formed by the connection of upper side-wall members 70 and 74 to upper-front wall member 71 and upper-rear wall member 72.

Lid 40 is constructed as an open framework by connecting side-lid members 42 and 46 to front-lid member 48 and rear-lid member 44. Lid 40 has the same dimensions as the top side of the dish holder formed from members 70, 71, 72 and 74. As can be seen from FIG. 2, lid 40 is attached to the top side of dish holder 10 via hinges 30.

Figure 3:
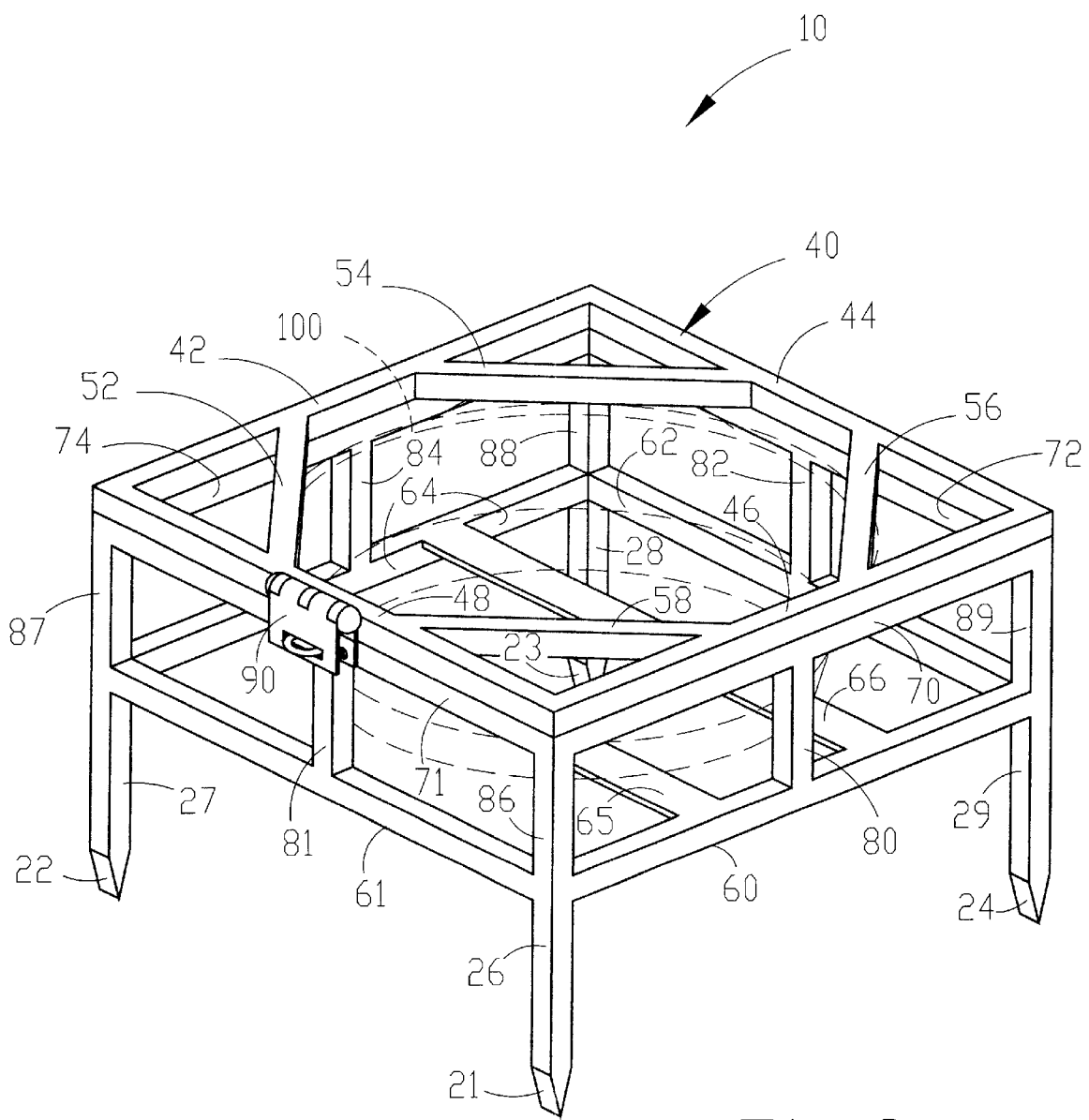
FIG. 3 is a perspective view of the invention of FIG. 1 showing the lid in a closed position for proper feeding.

As is shown in FIG. 3, lid 40 includes diagonal cross-members 52, 54, 56 and 58. Diagonal cross-member 52 is positioned at a forty-five degree angle with respect to side-lid member 42 and front-lid member 48. Diagonal cross-member 54 is positioned at a forty-five degree angle with respect to side-lid member 42 and rear-lid member 44. Diagonal cross-member 56 is positioned at a forty-five degree angle with respect to rear-lid member 44 and side-lid member 46. Diagonal cross-member 58 is positioned at a forty-five degree angle with respect to side-lid member 46 and front-lid member 48.

Pet dish holder 10 includes extensions 26, 27, 28 and 29 projecting from the bottom side of corner cross-members 86, 87, 88 and 89, respectively. Extensions 26, 27, 28 and 29 include pointed spikes 21, 22, 23 and 24 respectively, for anchoring holder 10 to the ground.

Pet dish holder 10 can include a latch attached to lid 40 and upper-front wall member 71. As the pet dish holder can be constructed of various materials such as plastic or metal, a latch may be unnecessary, depending upon the material used to construct dish holder 10. For example, in a preferred embodiment, dish holder 10 is constructed of wrought iron; constructing the holder of such a material results in sufficient lid weight to prevent most pets from improperly raising lid 40 and removing dish 100.

In operation, pet dish holder 10 is placed outside and anchored to the ground using spikes 21, 22, 23 and 24. The ground penetration depth of extensions 26, 27, 28 and 29 can be adjusted by the pet owner to adjust the feeding height to accommodate the size of the specific animal. An increased ground penetration, reducing the height of bowl 100 above the ground, can be used for shorter pets. Alternatively, a decreased ground penetration, increasing the height of bowl 100 above the ground, can be used for larger pets.

Once dish holder 10 has been anchored, a pet owner can raise lid 40 to place bowl 100 in dish holder 10, as shown in FIG. 1. The pet owner will then close the lid over the bowl. Once the lid is closed, latch 90 can be used to secure the lid in position. As is shown in FIG. 3, diagonal cross-members 52, 54, 56 and 58 are positioned in such a way as to prevent removal of bowl 100 from dish holder 10, while at the same time allowing a pet to access the food or water contained in the bowl. Each diagonal cross-member will cover a section of the rim of the bowl to prevent removal; leaving the majority of the concave portion of bowl 100 open for feeding.

As a pet feeds from a dish contained in holder 10, virtually all dropped food particles will fall through the open framework to the ground; requiring little or no active cleaning by the pet owner. The pet owner can easily brush any particles that do not fall away from the holder off of the open framework.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive pet dish holder is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention, what is claimed as new and desired to be secured by Letters Patent is as follows:

1. A pet dish holder comprising:
   a dish including a perimeter and a feeding area;
   a frame comprising a top side and a bottom side connected to said top side, said frame removeably supporting said dish;
   a removable lid having at least one cross member capturing at least a portion of the perimeter of said dish to hold said dish between said frame and said lid presenting no obstruction to accessing the feeding area of said dish; and
   at least one spike protruding from said bottom side of said frame.

2. The pet dish holder as claimed in claim 1 further comprising an extension connecting said bottom side of said frame to said spike.

3. The pet dish holder as claimed in claim 1 wherein said lid further comprises a connection to said top side of said frame.

4. The pet dish holder as claimed in claim 3 wherein said connection comprises a hinge.

5. The pet dish holder as claimed in claim 3 wherein said connection comprises a latch.

6. The pet dish holder as claimed in claim 1 further comprising at least one side-wall to connect said top side to said bottom side.

7. A pet dish comprising:
   a dish holder including a perimeter and a feeding area;
   a frame comprising a top side and a bottom side connected to said top side, said frame removably supporting said dish; and a lid having at least one cross member capturing at least a portion of the perimeter of said dish to hold said dish between said frame and said lid presenting no obstruction to accessing the feeding area of said dish.

8. The pet dish holder as claimed in claim 7 further comprising at least one spike protruding from said bottom side of said frame.

9. The pet dish holder as claimed in claim 7 wherein said lid further comprises a connection to said top side of said frame.

10. The pet dish holder as claimed in claim 9 wherein said connection comprises a hinge.

11. The pet dish holder as claimed in claim 9 wherein said connection comprises a latch.

12. A pet dish comprising:

a dish holder including a perimeter and a feeding area;

a frame removably supporting said dish, said frame comprising a top side and a bottom side connected to said top side by at least one side-wall, said bottom side comprising at least one cross-member adapted to support said dish, said side-wall comprising at least one cross-member adapted to support said dish, said side-wall comprising at least one cross-member adapted to prevent extraction of said dish from said frame through said wide-wall, said top side comprising an opening to provide for extraction of said dish from said frame;

a lid comprising at least one cross member capturing at least a portion of the perimeter of said dish between said frame and said lid presenting no obstruction to accessing the feeding area of said dish, said lid further comprising a removable connection to said top side of said frame, said removable connection comprising a hinge; and at least one extension protruding from said bottom side of said frame, said extension comprising a spike positioned at an end of said extension opposite to said bottom side of said frame.

* * * * *

UNITED STATES PATENT AND TRADEMARK OFFICE
CERTIFICATE OF CORRECTION

PATENT NO. : 6,557,489 B2
DATED : May 6, 2003
INVENTOR(S) : King, Nancy

It is certified that error appears in the above-identified patent and that said Letters Patent is hereby corrected as shown below:

Column 6,
Line 2, delete "support said dish, said side wall; comprising at least one cross-member adapted to";
Line 5, reads "wide-wall"; this should read -- side-wall --;

Signed and Sealed this

Ninth Day of September, 2003

JAMES E. ROGAN
*Director of the United States Patent and Trademark Office*